Sept. 25, 1951            K. H. SNOW            2,568,973
DEEP WELL COOKER WITH ADJUSTABLE HEATING ELEMENT
Filed April 26, 1946            2 Sheets-Sheet 1
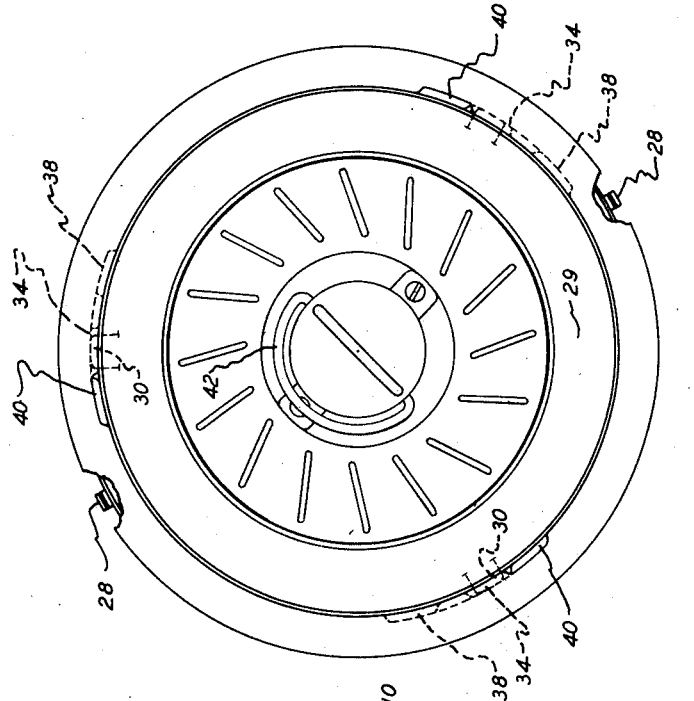
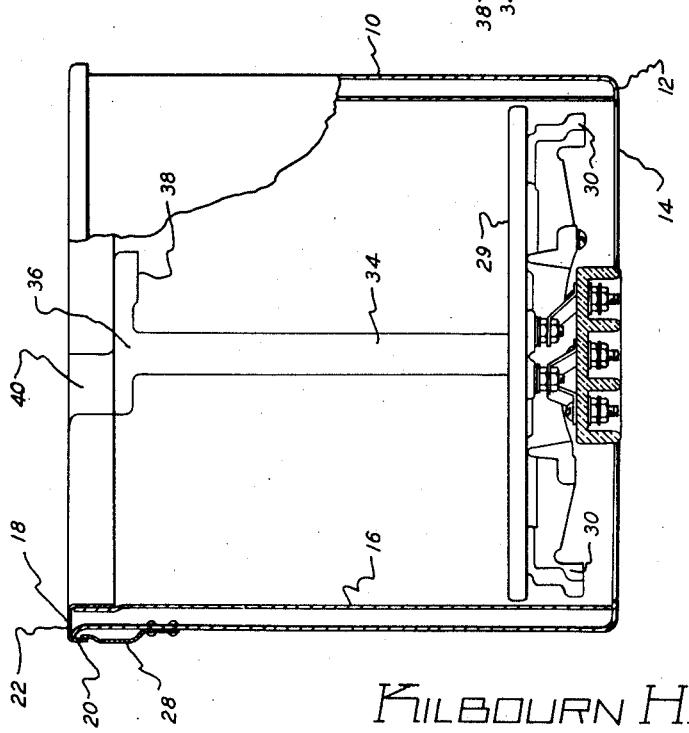
Inventor
KILBOURN H. SNOW
By Beaman & Langford
Attorneys Sept. 25, 1951 K. H. SNOW 2,568,973
DEEP WELL COOKER WITH ADJUSTABLE HEATING ELEMENT
Filed April 26, 1946 2 Sheets-Sheet 2
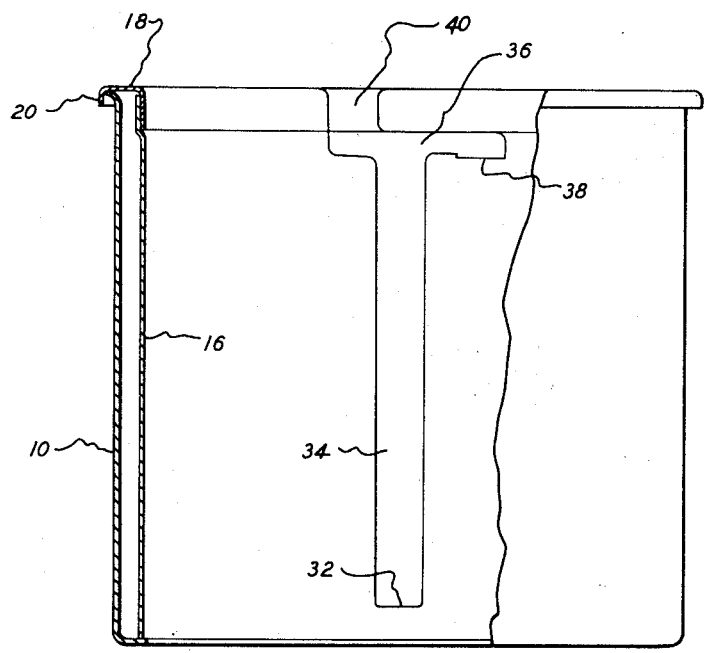
Fig_3.
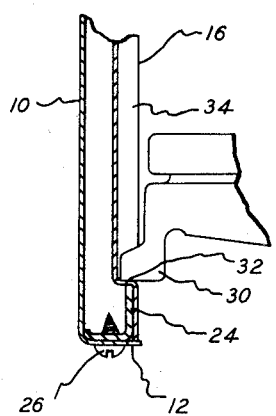
Fig_4.
Inventor
KILBOURN H. SNOW
By Bearman & Langford
Attorneys Patented Sept. 25, 1951

2,568,973

UNITED STATES PATENT OFFICE 2,568,973

DEEP WELL COOKER WITH ADJUSTABLE HEATING ELEMENT

Kilbourn H. Snow, Jackson, Mich., assignor to The Sparks-Withington Company, Jackson, Mich., a corporation of Ohio Application April 26, 1946, Serial No. 665,019

1 Claim. (Cl. 219—37)

The present invention relates to improvements in electric stoves, cookers and the like, having particular reference to deep-well cookers having an elevatable burner, and constituting an improvement upon the construction disclosed in my co-pending application 543,284, filed July 3, 1944, now Patent Number 2,485,990.

One object of the invention is to provide a deep-well cooker having an elevatable burner which may selectively function as either a deep-well cooker or a top burner on an electric stove or the like and which is characterized by its simplicity of construction and cleanability.

Another object of the invention is to provide an improved deep-well cooker having a manually and vertically adjustable burner which may be supported either in the well and function as a deep-well cooker or may be selectively elevated to an upper position to function as a top burner.

A still further object of the invention is to provide a combination deep-well cooker and top-burner construction which may be readily cleaned and one which is relatively free of all structure in which dirt and particles of food may accumulate.

These and other objects and advantages residing in the combination, construction and arrangement of the parts will be more fully appreciated from a consideration of the following specification and claim.

In the drawings,

Fig. 1 is a side elevational view of the cooker removed from the deep well and partly shown in vertical cross section, Fig. 2 is a plan view of the cooker assembly shown removed from the deep well, Fig. 3 is a view similar to Fig. 1 with the burner unit removed, and Fig. 4 is a fragmentary sectional view shown on a large scale and illustrating the manner of support of the burner.

Referring to the drawings, the deep-well cooker assembly comprises an outer sheet metal shell 10 having a narrow flange 12 defining a large opening 14 in the bottom of the cooker. An inner shell 16 is just slightly larger in diameter than the opening 14 so as to be supported on the inner edge of the flange 12 to avoid any appreciable amount of flange projecting inwardly from the shell 16 upon which food particles and dirt may accumulate. At its upper end, the shell 16 is spot welded or otherwise secured into a flange member 18. As more fully disclosed in my above-identified co-pending application, the down-turned peripheral edge 20 of the flange 18 is supported upon a recessed ledge defining an opening at the top of the electric range, through which the outer shell 10 is inserted with a reasonably close fit. It will be noted that the outer shell 10 is flared outwardly at 22 at its upper end so as to position the inner shell 16 concentrically within the outer shell 10.

As more clearly shown in Fig. 4, at spaced points around the flange 12, angle plates 24 are spot-welded to the shell 16 to concentrically space the shells 10 and 16 in their telescoping relation and at the same time provide means for removably assembling the outer shell 10 to the inner shell 16 through screws 26. Locating springs 28 are located in opposed diametric relation for locating the position of the deep-well assembly in the opening of the electric range. It will be understood that in Fig. 1 the spring 28 is shown out of its true position for the purposes of illustration.

The electric burner 29 is equipped with integral cast leg portions 30 which with the burner in its lowered position rests upon the shoulder 32 reinforced by the plates 24, and defined at the bottom of each vertical groove 34. Each groove 34 opens into a horizontal groove 36 having at one end a point of support at 38 upon which the leg portions 30 rests when the burner 29 is lifted by its bail 42 from the position shown in Fig. 4 upwardly to the groove 36 and then is partially rotated so as to bring the leg portions 30 to rest upon portions 38 of the horizontal grooves 36. In this position the burner 29 will be just above the top of the flange 18 and will function as a top burner. In order to bodily remove the burner 29 from the deep-well construction, an entrance groove 40 is provided.

By forming shoulders 32 from the inner wall of the shell 16 all accumulations of dirt and food particles may be readily removed as there are so cracks or openings into which foreign matters may accumulate and be non-accessible. It will be further understood that any food that may boil over or spill over into the shell 16 will pass right on through the opening 14 without any point of accumulation and the inside of the shell 16 may be readily cleaned as there are no substantial flanges, ledges or other points of accumulation for foreign matter.

Having thus described my invention, what I claim as new and desire to be covered by Letters Patent is:

A combination deep well and top burner assembly for electric stoves and the like in which the burner is solely supported within the deep well by the wall structure thereof and is manually raised and lowered and is removable from the deep well for cleaning purposes, comprising a deep well structure having inner and outer spaced apart substantially cylindrical walls, with the inner wall having an annular series of vertical grooves pressed outwardly therein in spaced relation along the inner surface thereof and out of contact with the outer wall, said vertical grooves terminating at their lower ends in horizontal shoulders consisting of an integral part of the inner wall and located above the lower end thereof, each of said guide slots being provided at its upper end with a laterally extending cross slot below the top of the inner wall of the deep well structure and substantially at the upper position of the burner element, whereby the vertical and cross slots present a substantially T-shaped formation at the upper end, and said substantially T-shaped formation having a depressed horizontal support recess at one end and having an upwardly presented entrance groove at its other end with said supporting recess and said entrance groove out of direct alignment with the vertical groove, an electric burner element movable within the deep well adjustable to lower and upper positions of use in the bottom of the well and top of the well respectively and removable through the open top of the well, and peripherally extending horizontally disposed supporting lugs on the burner received and movable within the slots to rest against the horizontal shoulders of said slots in the lowered position and to rest within the horizontal recesses of the T-shape formation when in the raised position of the burner.

KILBOURN H. SNOW.

REFERENCES CITED

The following references are of record in the file of this patent:

UNITED STATES PATENTS

| Number | Name | Date |
|---|---|---|
| 923,224 | Welch | June 1, 1909 |
| 2,416,140 | Barnsteiner | Feb. 18, 1947 |
| 2,416,645 | Rutenber | Feb. 25, 1947 |
| 2,481,227 | Kuenne | Sept. 6, 1949 |
| 2,485,990 | Snow | Oct. 25, 1949 |